May 30, 1950        J. F. LIPSCOMB        2,509,647
LOCK NUT
Filed Aug. 27, 1945
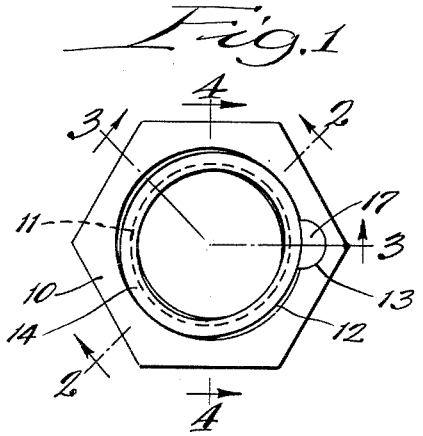
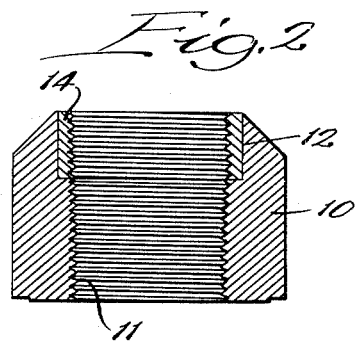
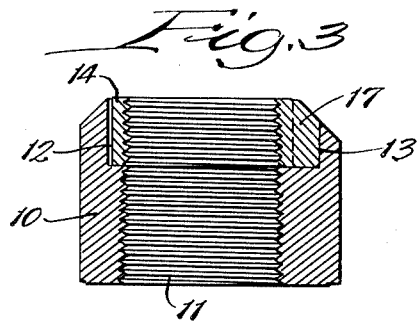
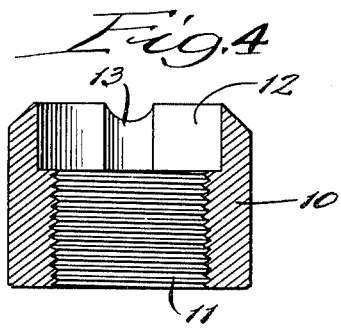
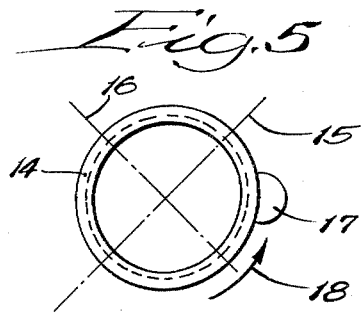
Inventor:
John F. Lipscomb,
By Dawson, Booth & Spangenberg,
Attorneys Patented May 30, 1950

2,509,647

UNITED STATES PATENT OFFICE 2,509,647

LOCK NUT

John F. Lipscomb, Elkhart, Ind., assignor, by mesne assignments, to Security Locknut Corporation, Chicago, Ill., a corporation of Illinois Application August 27, 1945, Serial No. 612,810

1 Claim. (Cl. 151—15)

This invention relates to lock nuts and more particularly to a nut construction which will remain tight on a bolt or the like under substantially all conditions of use.

It is one of the objects of the invention to provide a lock nut which offers a minimum resistance to threading on to a bolt and a maximum resistance to removal from the bolt.

Another object is to provide a lock nut which is substantially insensitive to vibration and which will remain tight over long periods of use.

Still another object is to provide a lock nut which is simple and inexpensive to manufacture and assemble.

The above and other objects and advantages of the invention will be more readily apparent from the following description when read in connection with the accompanying drawing, in which—

Figure 1 is a top plan view of a lock nut embodying the invention;

Figures 2, 3 and 4 are sections respectively on the lines 2—2, 3—3 and 4—4 of Figure 1; and Figure 5 is a plan view of the locking ring.

The nut as illustrated in the drawing is generally similar to that disclosed in the patent to Green, No. 1,986,891, and comprises a nut body 10 which may be hexagonally shaped on its exterior and which is formed on its interior with a threaded cylindrical bore 11. At its upper end the nut body is formed with a cylindrical recess 12 coaxial with the bore 11 and formed with smooth interior walls interrupted at one side by a peripheral notch 13 extending throughout the axial length of the recess.

The recess is adapted to receive a locking ring 14 which is interiorly threaded with threads forming a continuation of the threads in the bore 11 so that when a nut is threaded through the bore 11 it will continue to thread into the ring 14. The ring is initially formed generally oval shaped with its major axis as indicated at 15 in Figure 5, and its minor axis at 16. When originally formed, the major axis 15 of the ring is slightly in excess of the diameter of the recess 12. When the ring is to be assembled in the recess, its major axis is squeezed in slightly so that when it is in place in the recess it will tend to expand against the sides of the recess to hold the ring in place therein. It will be noted, as originally formed and even when assembled, the interior diameter of the ring along its minor axis is slightly shorter than the diameter of a bolt on which the ring is to be threaded so that the ring will frictionally grip the bolt to resist rotation thereon.

The ring is held against rotation relative to the nut body by a projecting lug 17 formed at one side of the ring to fit into the notch 13. The lug is located between the ends of the major and minor axes of the ring and is displaced from the minor axis in the same direction in which the ring is turned to unscrew it from the bolt as indicated by the arrow 18 in Figure 5.

In using the lock nut of the invention, the nut body is placed on a threaded bolt or rod and is turned in the usual manner to draw it on to the threads on the bolt or rod. As the end of the bolt or rod reaches the upper end of the threaded bore 11, it starts to thread into the ring 14 causing the ring to expand slightly along its minor axis so that the ring will frictionally grip the bolt. Engagement of the lug with the notch 13 prevents turning of the ring in the recess 12 at this time. Preferably the threads in the ring are slightly out of alignment with those in the nut body so that the ring will rise slightly from the nut body. This reduces the effect of nut body vibration on the ring and wear on the ring threads.

By reference to Figure 5 it will be noted that the turning force exerted on the ring 14 is applied through the lug 17 in a clockwise direction so that the ring tends to be drawn in along its major axis to become more nearly round. This turning force on the ring facilitates threading it on to the bolt so that it can be screwed on without requiring exertion of a large force. When the nut is threaded on to the bolt, any tendency of the nut to unscrew exerts a force on the lug 17 in the direction of the arrow 18 of Figure 5. This force tends to draw the ring in along its minor axis causing the ring to wrap down tightly against the bolt so that unscrewing of the nut will be resisted by a force substantially larger than that required to thread the nut on to the bolt. I have found that with a construction as shown this force will be several times that required to thread the nut on to the bolt. Furthermore, since the ring is physically separated from the nut body, any vibrations acting on the relatively larger mass of the nut body act only to a much smaller degree on the ring and are insufficient to cause loosening or unthreading of the ring. Therefore, the only forces tending to unscrew the ring are those acting on it through the lug 17 to produce the wrap down effect, causing the ring to grip the bolt tightly and to prevent it from unscrewing.

With a single ear construction the ring can easily be assembled in the recess in proper position to provide the proper relationship between the threads. Also the ring can centralize itself accurately in the recess when the nut is threaded on a bolt to eliminate binding and uneven strain on the ring.

While only one embodiment of the invention has been shown and described in detail herein, it is to be understood that it is illustrative only and is not to be taken as a definition of the scope of the invention, reference being had for this purpose to the appended claim.

What I claim is:

A lock nut comprising a threaded nut body formed at one end with a substantially cylindrical recess coaxial with the threads, the recess having a single notch in one side only thereof, a threaded locking ring fitting in the recess, the locking ring being generally oval and having its minor axis less than the diameter of a bolt on which it is to be threaded whereby it will frictionally grip the bolt, the major axis of the ring normally being greater than the diameter of the recess whereby the ring will frictionally engage the sides of the recess to hold itself therein, and a single projecting lug at one side only of the ring displaced from both the minor and major axes and fitting into the notch to prevent relative rotation between the ring and the nut body, the lug being displaced circumferentially from the minor axis of the ring in the direction in which the ring is turned to unscrew it.

JOHN F. LIPSCOMB.

REFERENCES CITED

The following references are of record in the file of this patent:

UNITED STATES PATENTS

| Number | Name | Date |
|---|---|---|
| 1,623,686 | Kolthoff | Apr. 5, 1927 |
| 1,986,891 | Green | Jan. 8, 1935 |
| 2,399,639 | Kelly | May 7, 1946 |